United States Patent
Mazzouji et al.

(10) Patent No.: US 8,591,175 B2
(45) Date of Patent: Nov. 26, 2013

(54) HYDRAULIC MACHINE INCLUDING MEANS FOR INJECTING A FLOW DRAWN FROM A MAIN FLOW

(75) Inventors: Farid Mazzouji, Vourey (FR); Monique Traversaz, Gieres (FR)

(73) Assignee: Alstom Renewable Technologies, Grenoble (FR)

( * ) Notice: Subject to any disclaimer, the term of this patent is extended or adjusted under 35 U.S.C. 154(b) by 718 days.

(21) Appl. No.: 12/452,817

(22) PCT Filed: Jul. 23, 2008

(86) PCT No.: PCT/FR2008/051385
§ 371 (c)(1),
(2), (4) Date: Jan. 25, 2010

(87) PCT Pub. No.: WO2009/016315
PCT Pub. Date: Feb. 5, 2009

(65) Prior Publication Data
US 2010/0129198 A1    May 27, 2010

(30) Foreign Application Priority Data
Jul. 23, 2007   (FR) .................................... 07 05332

(51) Int. Cl.
*F03B 3/02*   (2006.01)
*F03B 3/12*   (2006.01)

(52) U.S. Cl.
USPC ........................... 415/115; 415/144; 415/202

(58) Field of Classification Search
USPC ........... 415/115, 202, 231 R, 144; 416/231 R
See application file for complete search history.

(56) References Cited

U.S. PATENT DOCUMENTS

| | | | | |
|---|---|---|---|---|
| 1,942,995 A | * | 1/1934 | Biggs | ............................ 415/115 |
| 1,950,777 A | | 3/1934 | Biggs | |
| 1,961,114 A | * | 5/1934 | Tully et al. | ...................... 416/91 |
| 2,079,258 A | | 5/1937 | Logan | |
| 4,146,352 A | * | 3/1979 | Yasugahira et al. | .......... 415/144 |
| 4,355,949 A | * | 10/1982 | Bailey | .............................. 415/35 |
| 4,892,419 A | * | 1/1990 | Inoue et al. | .................... 384/322 |
| 5,823,740 A | * | 10/1998 | Cybularz et al. | .............. 415/115 |
| 5,879,130 A | * | 3/1999 | Beyer et al. | ................... 415/115 |
| 5,896,657 A | * | 4/1999 | Beyer et al. | ................ 29/889.71 |

(Continued)

FOREIGN PATENT DOCUMENTS

| | | |
|---|---|---|
| DE | 1187559 B | 2/1965 |
| DE | 1528821 A1 | 10/1969 |

(Continued)

OTHER PUBLICATIONS

Machine translation of DE 1187559 B from Espacenet.*

(Continued)

*Primary Examiner* — Edward Look
*Assistant Examiner* — Christopher R Legendre
(74) *Attorney, Agent, or Firm* — Dowell & Dowell, PC

(57) ABSTRACT

A hydraulic machine through which a main flow of water passes including at least one turbine blade having an upstream end and a downstream end and a channel extending an entire length of the blade for tapping flow from the main flow adjacent the upstream end of the blade and discharging the tapped flow at the downstream end of the blade in a direction of the main flow.

4 Claims, 2 Drawing Sheets

(56) References Cited

U.S. PATENT DOCUMENTS

| | | | |
|---|---|---|---|
| 5,924,842 A * | 7/1999 | Beyer et al. | 415/115 |
| 5,924,844 A * | 7/1999 | Cybularz et al. | 415/115 |
| 6,095,749 A * | 8/2000 | Beyer et al. | 415/115 |
| 6,155,783 A * | 12/2000 | Beyer | 416/90 R |
| 6,247,893 B1 * | 6/2001 | Beyer et al. | 415/115 |
| 6,368,059 B1 * | 4/2002 | Maines | 416/42 |
| 6,454,533 B2 * | 9/2002 | Beyer | 416/90 R |
| 6,524,063 B1 * | 2/2003 | Beyer et al. | 415/115 |
| 7,549,282 B2 * | 6/2009 | Widenhoefer et al. | 60/39.17 |
| 2010/0129198 A1* | 5/2010 | Mazzouji et al. | 415/115 |
| 2010/0129201 A1* | 5/2010 | Mazzouji et al. | 415/116 |

FOREIGN PATENT DOCUMENTS

| | | | |
|---|---|---|---|
| FR | 2914028 A1 * | 9/2008 | |
| JP | 59065983 | | 5/1984 |
| JP | 62195467 A * | | 8/1987 |
| JP | 63105300 A * | | 5/1988 |
| JP | 01163404 A * | | 6/1989 |
| JP | 03 005478 A | | 9/1991 |
| JP | 03206362 A * | | 9/1991 |
| JP | 08074726 A * | | 3/1996 |
| JP | 08326645 A * | | 12/1996 |
| JP | 2002235652 A * | | 8/2002 |
| JP | 2007023844 A | | 2/2007 |

OTHER PUBLICATIONS

Notice of Reasons for Rejection, Japanese Patent Application 2010-517462, mailed May 7, 2013, pp. 1-4.

* cited by examiner

HYDRAULIC MACHINE INCLUDING MEANS FOR INJECTING A FLOW DRAWN FROM A MAIN FLOW

BACKGROUND OF THE INVENTION

1. Field of the Invention

The present invention relates to a hydraulic machine of the type traversed by a main flow of water, comprising at least one blade profile of a turbine, having an upstream end and a downstream end, in the vicinity of which is formed at least one eddy zone or a reduced-pressure zone or a cavitation zone, the machine comprising means of injecting a flow tapped from said main flow, not modified relative to the main flow, in said eddy or reduced-pressure or cavitation zone so as to locally modify the main flow or increase the pressure in this zone.

2. Brief Description of the Related Art

Such a hydraulic machine is used, for example, in a plant for producing hydroelectricity. The machine is installed in the path of the current or is supplied with water from a reservoir into which one or more water courses are discharged.

In these hydraulic machines, there are zones in which the main flow traversing the machine is disturbed and forms eddies or exhibits a reduced pressure or cavitation zones, because of the configuration of the machine. Such zones disrupt the general performance of the hydraulic machine because they reduce the efficiency of action of the main flow in the hydraulic machine or cause problems of operation of the hydraulic machine.

The document U.S. Pat. No. 1,942,995 describes a hydraulic machine of the abovementioned type, making it possible to inject a flow tapped from the main flow in the cavitation zone being formed along the blades of the turbine wheel.

However, the outlet orifices for the tapped flow are arranged to inject the flow in a direction roughly perpendicular to the direction of the main flow. Such orifices do not make it possible to eliminate the eddy zones that are formed in the trail of the blades and also disturb the general performance of the hydraulic machine.

SUMMARY OF THE INVENTION

One of the objects of the invention is to alleviate these drawbacks by proposing a hydraulic machine making it possible to eradicate the eddy zones that are formed in the trail of any blade profile.

Accordingly, the invention relates to a hydraulic machine of the aforementioned type, in which the injection means comprising a duct drawing the flow from the main flow and making it open into the downstream end substantially in the direction of the main flow.

The injection of a flow tapped from the main flow into the downstream end of the blade profile makes it possible to modify the main flow in the eddy zone that is formed immediately downstream of the blade profile in the trail of the latter. The eddy zone is thus eliminated, which makes it possible to effectively make good the lack of performance in the action of the main flow in this zone, which enhances the performance and the behaviour of the hydraulic machine.

According to other features of the hydraulic machine:
  the duct comprises an inlet drawing the flow from the main flow upstream of the blade profile and an outlet opening into the eddy or reduced-pressure or cavitation zone,
  the injection means comprise a valve placed in the path of the tapped flow, the said valve being able to be moved between an open position in which it allows the tapped flow to pass from the main flow and a closed position in which it prevents the passage of the tapped flow, the movement of the valve is controlled by suitable control means,
  the blade profile is at least one blade of a plurality of blades of a Francis turbine wheel, said blades being arranged between a ceiling and a belt, the flow being tapped from the ceiling or from the belt by means of openings formed in said ceiling or in said belt, said flow opening into the downstream end of the at least one blade.

BRIEF DESCRIPTION OF THE DRAWINGS

Other aspects and advantages of the invention will appear during the following description, given as an example and made with reference to the appended drawings in which.

DESCRIPTION OF THE PREFERRED EMBODIMENT

The invention described below applies particularly to hydraulic machines of the Francis turbine type. Since these machines are known, they will not be described in detail in the present description. The invention also applies to other types of hydraulic machines in which problems of the formation of eddy, reduced-pressure or cavitation zones occur.

In the description, the terms "upstream" and "downstream" are defined with respect to the direction of flow of the main flow E traversing the hydraulic machine.

Figure 1:
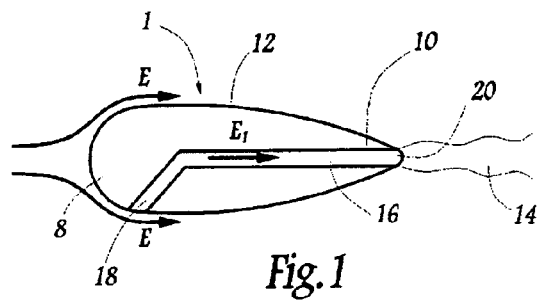
FIG. 1 is a schematic representation in section from the top of a blade profile of a turbine according to the invention.

With reference to FIG. 1, a member of a hydraulic machine of the blade profile 1 type of a turbine is described. Such a blade profile 1 is for example a fixed guide vane, a wicket gate or a turbine blade. The blade profile 1 shown in FIG. 1 is a fixed guide vane.

The function of fixed guide vanes and wicket gates is to guide a main flow E which traverses the rotor 4 of the turbine sweeping against the blades 6, which rotates the rotor 4 about a vertical axis Z-Z'.

The blade profile 1 has an upstream end 8 and a downstream end 10 connected together by side walls 12 swept by the main flow E. Whether it be a fixed guide vane, a wicket gate or a turbine blade, an eddy and/or reduced-pressure zone 14 is created in the vicinity of the downstream end 10, particularly immediately downstream of the downstream end 10, which can cause vibrations in the hydraulic machine.

The blade profile 1 comprises at least one duct 16 extending inside the profile between an inlet opening 18 and an outlet opening 20. The inlet opening 18 is placed in the vicinity of the upstream end 8 and emerges for example in one of the side walls 12 of the blade profile 1. A portion $E_1$ of the main flow E sweeping the side walls 12 is therefore tapped off in the duct 16 via the inlet opening 18 and is conveyed to the outlet opening 20. According to another embodiment, the duct 16 taps the flow $E_1$ on the outside of the blade profile 1 and conveys this flow to the outlet opening 20.

The outlet opening 20 emerges in the downstream end 10. Therefore, the tapped flow $E_1$ from the main flow E travels in the duct 16 and is injected into the zone 14 via the outlet opening 20. The effect of this is to modify the properties of the flow E in the zone 14 and thereby to prevent the vibration phenomena.

In the case of a blade 6, there is also a problem of the creation of cavitations on the profile of the blades 6 of the rotor 4 in a zone in the vicinity of the inlet edges or upstream end 8 and/or of the outlet edges or downstream end 10 of the blades. In order to alleviate this drawback, the blade 6, shown in FIG. 2, comprises other ducts (not shown) extending inside the blade between an inlet opening 22 and an outlet opening 24, 26. The inlet openings 22 of the ducts are placed in the vicinity of the upstream end 8 of the blade 6 so as to tap off a flow from the main flow E upstream of the blade. The outlet openings 24, 26 of the ducts are arranged to inject the tapped flow on the side walls of the blades 6 in the vicinity of the upstream end 8 and/or of the downstream end 10 of the blade 6. The effect of the tapped and injected flow is to locally modify the main flow E and thereby to prevent the phenomena of forming cavitation on the profile of the blades. Certain ducts therefore comprise an outlet opening 24 leading into a side wall of the blade 6 in the vicinity of the upstream end 8 in order to prevent the phenomena of forming cavitation on the blades in the vicinity of the upstream end 8. Other ducts comprise an outlet opening 26 opening into a side wall of the blade 6 in the vicinity of the downstream end 10 in order to prevent the phenomena of forming cavitation on the blades in the vicinity of the upstream end 10.

Figure 2:
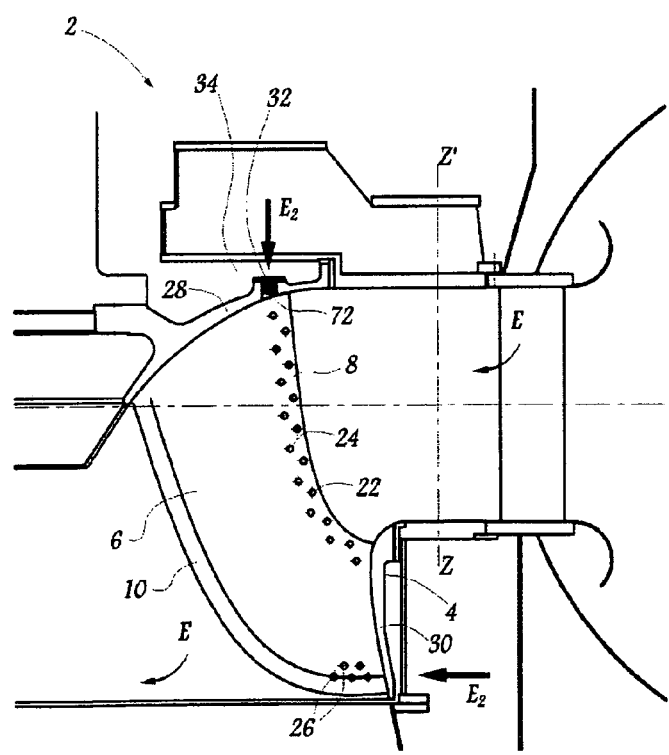
FIG. 2 is a partial schematic representation in section of a Francis turbine according to the invention.

According to various embodiments, the inlet and outlet openings may be placed in series along the upstream end 8 and the downstream end 10 of the blade 6 in a direction which may be perpendicular to the direction of the main flow E, as shown by the outlet openings 24 of FIG. 2.

According to a particularly advantageous embodiment, the outlet openings are arranged so as to open into the downstream end 10 of the blade 6 in the direction of the main flow E. The openings open, for example, into the base of the blade 6. The injection of the flow tapped into the downstream end makes it possible to eliminate the eddy zone that is formed in the zone of turbulence of the blades 6.

The blades 6 of the rotor 4 are placed between a ceiling 28 and a belt 30.

Figure 3:
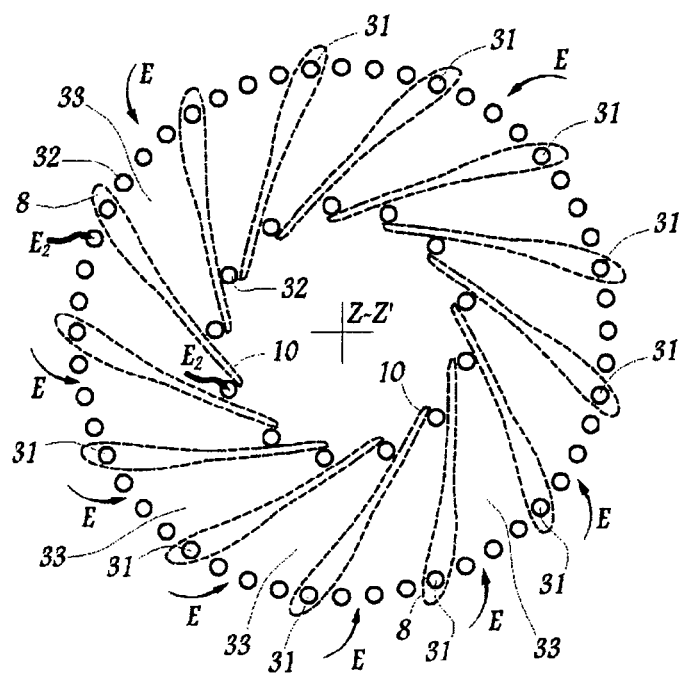
FIG. 3 is a schematic representation seen from above of the Francis turbine rotor of FIG. 2

According to one embodiment, the phenomena of cavitation on the blades may also be prevented by openings 31 made in the ceiling 28 opposite the blades 6, as shown in FIG. 3. These openings 31 communicate with the outlet openings 24, 26 and/or with the outlet openings 20 opening into the downstream end 10 by means of channels not shown. In this embodiment, a flow $E_2$ is tapped off from the main flow E and passes through the spaces between the fixed part of the turbine and the moving blades 6. The tapped flow $E_2$ is tapped off in the annular space 34 situated above the ceiling 28. This flow $E_2$ enters the openings 31 and is then guided to the outlet openings 24, 26 and/or 20.

In addition to the cavitation phenomena on the blades, there may also be phenomena of forming a vortex in the space 33 between the blades 6. These phenomena may be alleviated by means of ducts, the inlet and outlet orifices of which are placed between the upstream and downstream ends of the blades and open into the space 33 between the blades. According to one embodiment, the problem of forming a vortex between the blades 6 is solved by means of orifices 32 made in the ceiling 28, as shown in FIG. 2.

In this embodiment, the flow $E_2$ tapped off upstream of the blades 6 in the annular space 34 travels into the openings 32 and supplies the spaces 33 between the blades 6, as shown in FIG. 3. The openings 32 are distributed in the ceiling 28 facing the spaces 33 separating the blades 6. Therefore, the tapped flow $E_2$ is injected between the blades 6 and modifies the properties of the flow E in order to prevent the phenomena of forming a vortex between the blades 6.

As a variant, instead of or in addition to travelling via the ceiling 28, the tapped flow $E_2$ can travel through the belt 30 by means of openings (not shown) made in the latter.

According to an embodiment that can be applied to all the injection means described above, the injection means comprise a valve 72 placed in the path of the tapped flow, as shown in FIGS. 2 and 5. The valve 72 can be moved between an open position in which it allows the tapped flow to pass and a closed position in which it prevents the passage of the tapped flow. The valve 72 is for example placed in the vicinity of each inlet opening of the injection means and makes it possible manually or automatically to control the injection of the tapped flow. In the case of the Francis turbine, the valve 72 is provided in the vicinity of each opening 32 arranged in the ceiling 28.

The movement of the valve 72 is controlled by control means (not shown) which are mechanical or electric in a manner known per se. Therefore, during operating conditions of the hydraulic machine causing the formation of eddy or reduced-pressure or cavitation zones, an automatic system or an operator of the machine switches the valve(s) to the open position which makes it possible to inject the tapped flow in the said zones and to prevent the formation of these zones, as described above.

It should be noted that the tapped flow is not modified relative to the main flow E, that is to say that the water does not sustain any operation to modify its composition during the tapped flow.

The invention claimed is:

1. A hydraulic machine of the Francis turbine type, comprising a rotor traversed by a main flow (E) of water, the rotor having a plurality of blades positioned between a ceiling and a belt, each blade having an upstream end and a downstream end, at least one eddy zone, a reduced-pressure zone or a cavitation zone being formed adjacent the downstream end of each blade during rotation of the rotor, injection means for injecting first and second flows ($E_1$, $E_2$) tapped from the main flow, and not modified relative to the main flow (E), into the eddy, reduced-pressure or cavitation zone so as to modify the main flow (E) or increase the pressure in the zone, wherein the injection means for injecting the first flow ($E_1$) includes a duct extending through each blade in a direction of the main flow (E) and having an inlet opening for the first tapping flow ($E_1$) from the main flow (E) in a side wall of each blade adjacent the upstream end of each blade and an outlet opening in the downstream end of each blade so as to discharge the first flow ($E_1$) tapped from the main flow (E) in the direction of the main flow (E), and wherein the second flow ($E_2$) is tapped from the ceiling or the belt through openings formed in the ceiling or in the belt and passes through other openings in the blade which communicate with the outlet opening in the downstream end of each blade so as to discharge the second flow ($E_2$) in the direction of the main flow (E).

2. The hydraulic machine according to claim 1, wherein the outlet opening is into the eddy, reduced-pressure or cavitation zone.

3. The hydraulic machine according to claim 2, including valves mounted in the openings in the ceiling or the belt for regulating the second flow ($E_2$) through the ceiling or the belt.

4. The hydraulic machine according to claim 3, wherein movement of each valve is controlled by a controller.

* * * * *